United States Patent [19]

Tanaka

[11] Patent Number: 5,036,937

[45] Date of Patent: Aug. 6, 1991

[54] EXERCISE VEHICLE

[75] Inventor: Minoru Tanaka, Cypress, Calif.

[73] Assignee: Yamaha Hatsudoki Kabushiki Kaisha, Iwata, Japan

[21] Appl. No.: 389,531

[22] Filed: Aug. 4, 1989

[51] Int. Cl.⁵ ............................................. B62K 11/00
[52] U.S. Cl. ................................. 180/205; 180/210; 280/212; 280/214; 188/292
[58] Field of Search ................ 180/210, 207, 205; 280/282, 288.1, 269, 212, 214, 216; 188/290, 292, 344, 24.11

[56] References Cited

U.S. PATENT DOCUMENTS

| | | | |
|---|---|---|---|
| 2,633,030 | 3/1953 | Colden | 180/207 |
| 4,111,274 | 9/1978 | King et al. | 180/205 |
| 4,456,277 | 6/1984 | Carpenter | 180/205 |
| 4,717,164 | 1/1988 | Levavi | 180/210 |
| 4,799,567 | 1/1989 | Gaddi | 180/207 |
| 4,881,625 | 11/1989 | Redelman | 188/290 |

FOREIGN PATENT DOCUMENTS

| | | |
|---|---|---|
| 272629 | 3/1952 | Japan . |
| 3720442 | 8/1962 | Japan . |
| 281812 | 3/1973 | Japan . |
| 48-46773 | 6/1973 | Japan . |
| 4910451 | 3/1974 | Japan . |
| 51-21871 | 7/1976 | Japan . |
| 52-53079 | 4/1977 | Japan . |
| 53-17220 | 6/1978 | Japan . |
| 53-30419 | 8/1978 | Japan . |
| 272627 | 3/1981 | Japan . |
| 58-152960 | 4/1982 | Japan . |
| 57-87771 | 6/1982 | Japan . |
| 57-159590 | 10/1982 | Japan . |
| 57-58060 | 12/1982 | Japan . |

Primary Examiner—Richard Bertsch
Attorney, Agent, or Firm—Ernest A. Beutler

[57] ABSTRACT

A three-wheel exercise vehicle that may be operator pedaled by means of a crank assembly that is coupled by a transmission to a wheel. In addition, an internal combustion engine may power this wheel. The pedal-operated crank assembly is also coupled to a hydraulic pump that pumps fluid through a closed circuit including a restrictive orifice for acting as a brake on the speed of the vehicle when coasting and also providing a load for the operator to exercise when the vehicle is being powered by the internal combustion engine. An improved seating arrangement is provided that will afford great comfort for the operator.

20 Claims, 5 Drawing Sheets

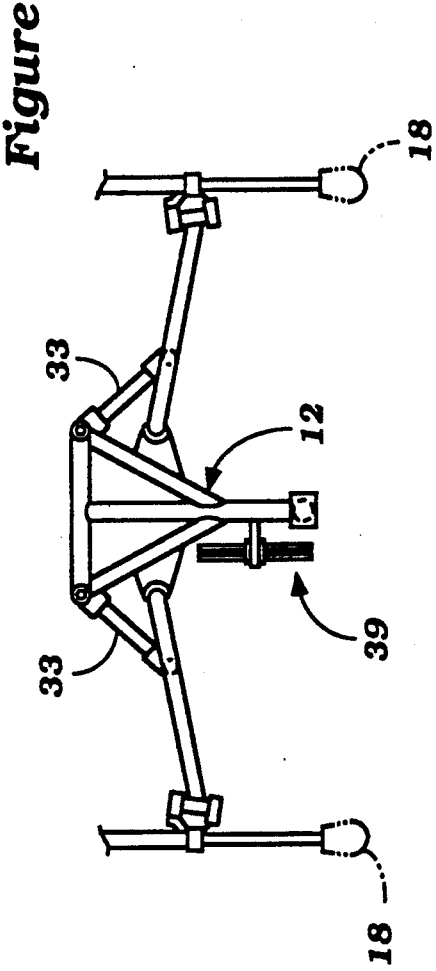
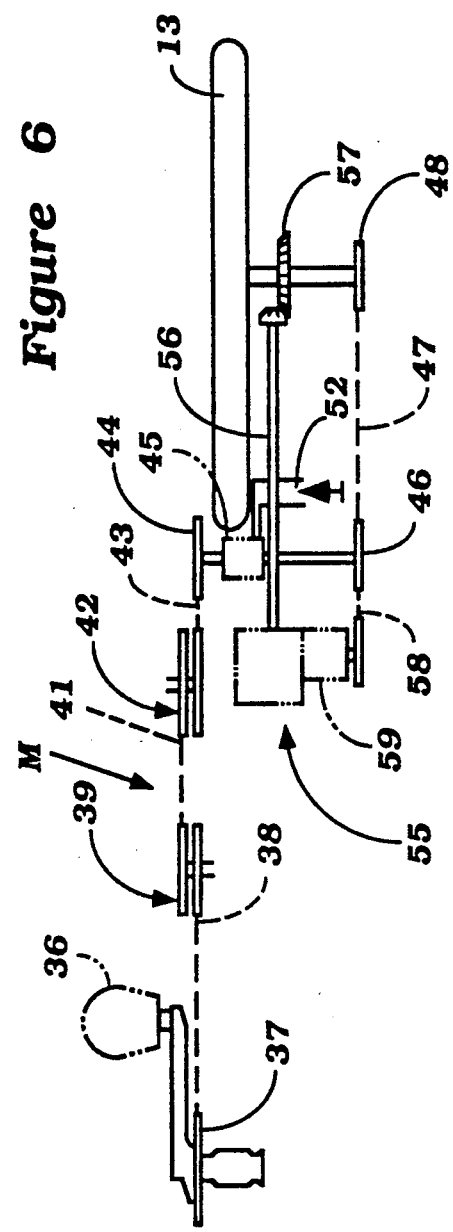

EXERCISE VEHICLE

BACKGROUND OF THE INVENTION

This invention relates to an exercise vehicle and more particularly to an improved vehicle that can be occupant propelled or power operated for a wide variety of applications.

As is well known, a wide variety of exercise bicycles have been proposed. For the most part, these bicycles are not truly bicycles in that they operate in a fixed position and the operator merely is able to vary the load on the crank mechanism so as to exercise the lower portion of the torso and particularly the legs. Although these vehicles have considerable utility, frequently the users lose interest in exercising in them because of their fixed nature. Furthermore, because of their fixed nature they must be placed in a location in a house and generally left there. This is due to their construction and also the relatively heavy weight of most exercise bicycles.

It is, therefore, a principal object of this invention to provide an exercise vehicle that has wider application.

It is another object of this invention to provide an exercise vehicle that can be utilized for transportation as well as exercise purposes.

As is well known, the elderly and the infirmed require some convenient, low cost and relatively mobile form of transportation. Although a variety of powered vehicles have been proposed for this purpose, these same individuals also can benefit from exercise although it is desirable to insure that the exercise vehicle be safe for them to operate and provide a means for self propulsion in the event the operator becomes tired.

It is, therefore, a still further object of this invention to provide a vehicle that can be utilized by the elderly or disabled for both transportation and exercise purposes.

In many areas of the country, the terrain over which a vehicle operates can have considerable upgrades and downgrades. If the vehicle is solely occupant propelled, many of the individuals that use it may not be able to pedal up the steep inclines. Also, when travelling down steep downgrades, there is a concern that the vehicle can operate at a faster rate of speed than is comfortable for the operator.

It is, therefore, a still further object of this invention to provide a vehicle that can be utilized over varying terrains and which will provide power for driving up steep inclines and also an automatic braking device for governing the speed during descent.

When a vehicle is provided with a power plant in addition to the operator motivation for the vehicle, there is a tendency for the operator to rely upon the power plant and hence the exercise purposes of the vehicle will be defeated. It is, therefore, a still further object of this invention to provide a powered vehicle in which the operator can exercise even though the vehicle is being driven under its own power.

In conjunction with self-propelled vehicles, particularly those to be utilized by the infirmed or the disabled, it is desirable that the operator can be in a comfortable position in which he propels the vehicle. Also, the vehicle should be very stable and insure that it cannot become overturned without requiring the operator to maintain the vehicle in its stable position.

It is, therefore, a still further object of this invention to provide an improved self-propelled vehicle that will be stable and comfortable for the operator during long periods of use.

SUMMARY OF THE INVENTION

A first feature of this invention is adapted to be embodied in a self propelled three-wheeled vehicle that is comprised of a frame assembly which journals a single rear wheel at the rear thereof and a pair of dirigible front wheels at the front thereof. The rear wheel has a substantially larger diameter than the front wheels and a seat is carried by the frame longitudinally between the front and rear wheels. The seat is positioned so the seat portion is depressed below the top of at least the rear wheel with the back portion of the seat lying at least in part above the rear wheel so that a rider seated on the seat is in a partially reclined position. A crank assembly is journaled about an axis positioned forwardly and above the axis of the front wheels for pedalling by an operator seated upon the seat. A transmission transmits drive from the crank assembly to the rear wheel.

Another feature of the invention is adapted to be embodied in a self-propelled vehicle that includes an operator-pedalled crank assembly and a transmission for driving at least one of the wheels from this crank assembly. In accordance of the invention, a hydraulic pump assembly is coupled to one of the wheels for driving of the pump assembly along with the wheel. The pump assembly circulates fluid through a path having a resistance whereby the pump assembly acts as a governor brake on the vehicle.

Yet another feature of the invention is adapted to be embodied in a vehicle having an operator-controlled crank assembly with a transmission for operatively connecting the crank assembly to at least one of the vehicle wheels for operator propulsion of the vehicle. In addition, an internal combustion engine is incorporated that is connected by means of a transmission assembly to one of the vehicle wheels for propelling the vehicle. In accordance with this feature of the invention, a load is coupled to the crank assembly so that an operator may pedal the load during internal combustion engine propulsion of the vehicle so that the operator may exercise while the internal combustion engine is powering the vehicle.

BRIEF DESCRIPTION OF THE DRAWINGS

FIG. 5 is cross-sectional view taken along the line 5—5 of FIG. 4.

FIG. 6 is a partially schematic top plan view of the vehicle showing the powering and exercising arrangement.

DETAILED DESCRIPTION OF THE PREFERRED EMBODIMENT OF THE INVENTION

Figure 1:
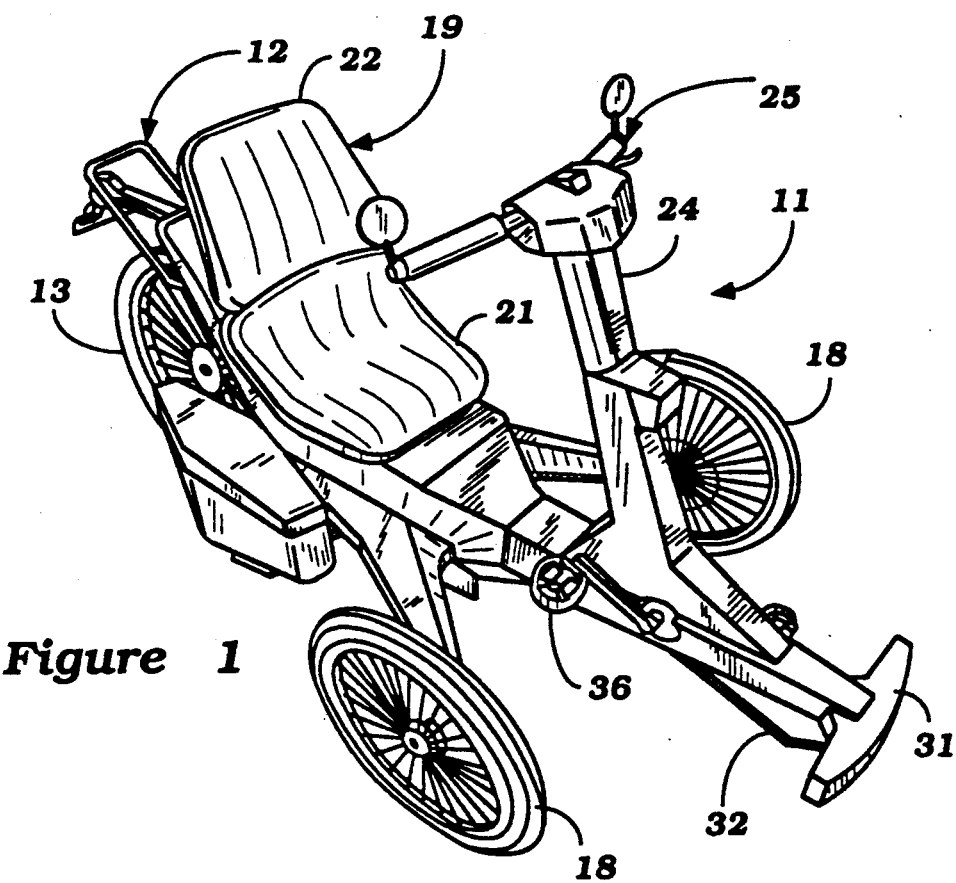
FIG. 1 is a perspective view taken from the front and above showing a self-propelled vehicle constructed in accordance with an embodiment of the invention.
Figure 2:
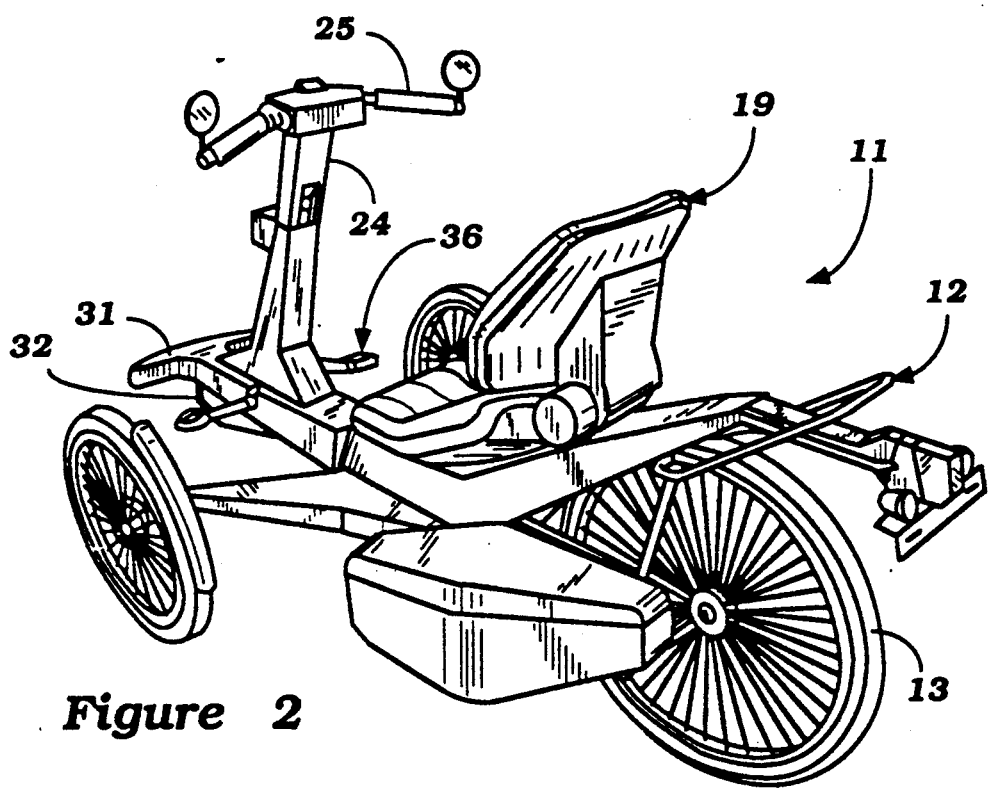
FIG. 2 is a perspective view from above and the rear of the vehicle.
Figure 3:
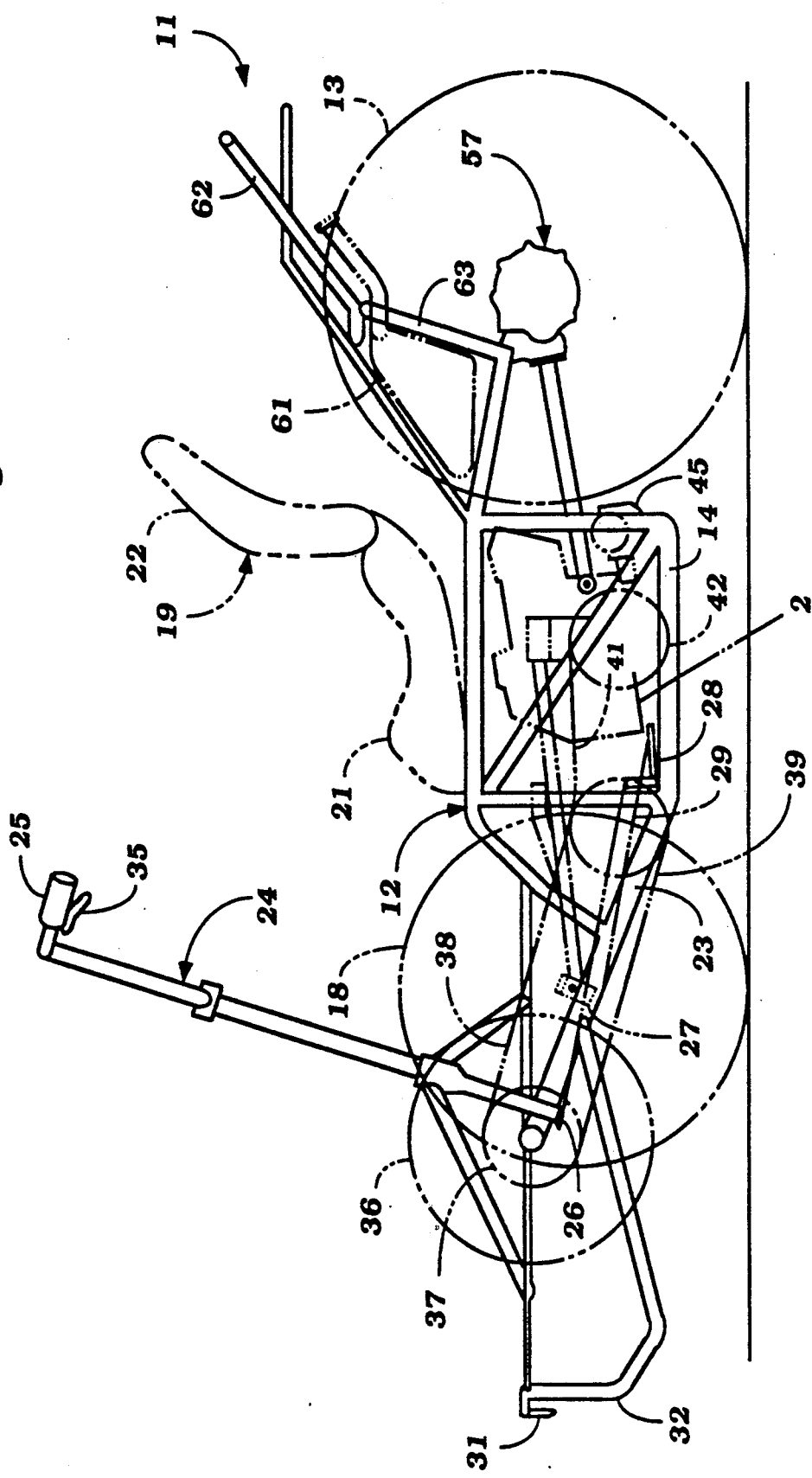
FIG. 3 is a side elevational view of the vehicle, with the body removed and certain portions shown in phantom.
Figure 4:
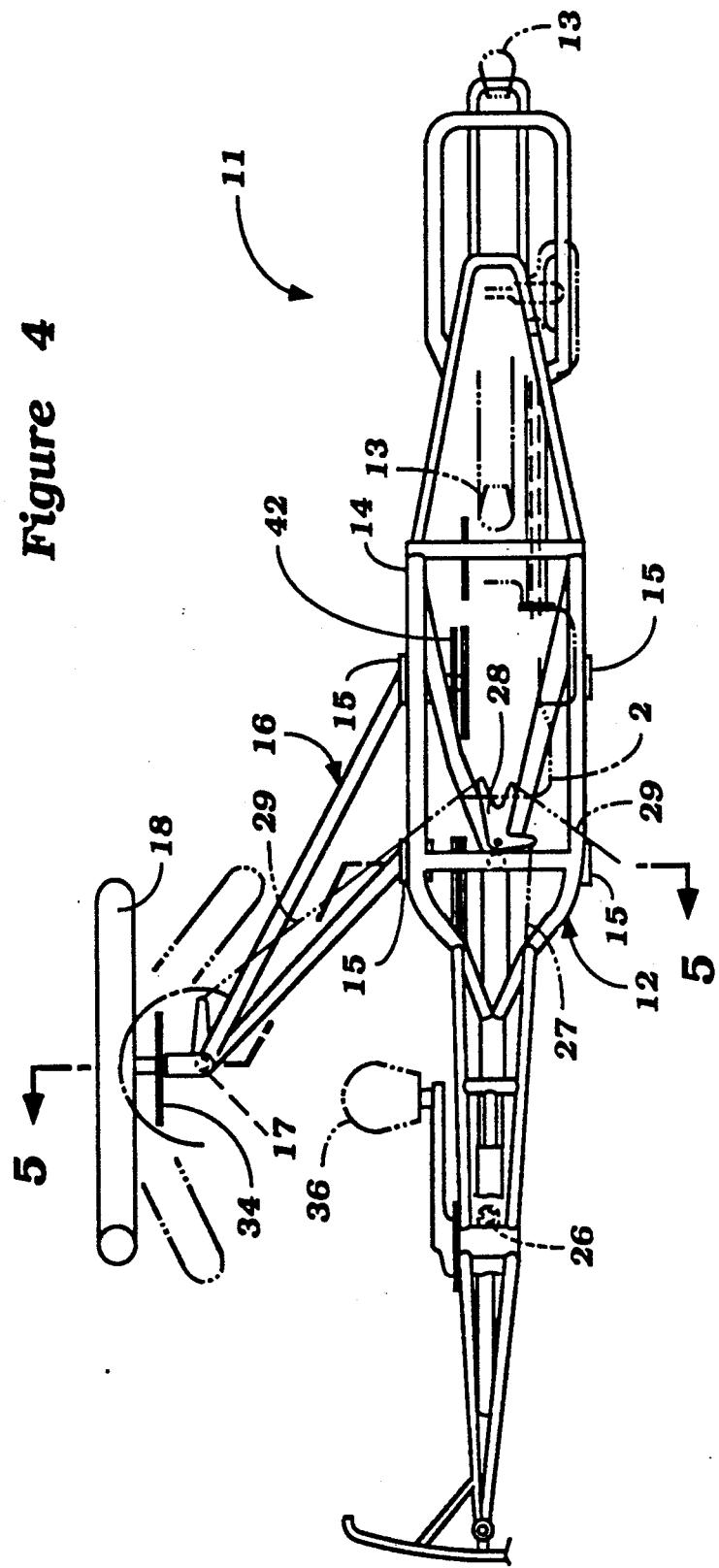
FIG. 4 is a partial top plan view of the vehicle.

Referring now in detail to the drawings, an exercise vehicle constructed in accordance with an embodiment of the invention is identified generally by the reference numeral 11. The vehicle 11 is comprised of a frame assembly, indicated generally by the reference numeral 12 which is, in the depicted embodiment, of the welded up tubular type. It is to be understood, however, that other types of frame assemblies can be employed in conjunction with the invention. The frame assembly 12 is provided with either a rigid or a cushioned suspension assembly that rotatably journals a driven rear wheel 13 that is positioned generally on the longitudinal center line of the vehicle 11. As will become apparent, the wheel 13 may be powered either by an operator of the vehicle 11 or by a propulsion unit such as an internal combustion engine.

The frame assembly 12 is comprised of a pair of side, generally box shaped assemblages 14, each of which has a pair of pick up points 15 on which a pair of forwardly extending suspension arms, indicated generally by the reference numeral 16 are supported. These suspension arms 16 have upright pivots 17 that journal a respective front wheel assembly 18 for steering movement about a generally vertically extending steering axis.

As may be seen best in the figures, the rear wheel 13 is disposed generally at the rear of the vehicle and of the frame 12 while the front wheels 18 are disposed generally forwardly of the frame assembly 12. The front wheels 18 may also be suspended for suspension movement relative to the frame 12 or may be rigidly carried by the frame 12. It will be noted that the front wheels 18 have a substantially smaller diameter than the rear wheel 13.

A seat, indicated generally by the reference numeral 19 and having a seat portion 21 and backrest portion 22 is carried by the frame assembly 12 generally centrally thereof. The seat portion 21 is disposed longitudinally between the front wheels 18 and the rear wheel 13 and is disposed so that a rider seated thereupon will be seated at a point considerably lower than the top of the rear wheel 13 and at a level approximately equal to the height of the front wheel 18. The backrest portion 19 inclines generally rearwardly so that the rider will sit in a semireclined position. However, the angle of recline is relatively shallow so that the operator's visibility will not be adversely effected.

A forwardly extending portion 23 of the frame 12 carries a mast assembly 24 for a steering shaft journaled for steering movement about a generally vertically upstanding steering axis and one which steering shaft carries a handlebar assembly 25 in convenient proximity to an operator seated on the seat 19. The steering shaft has a steering arm 26 that is coupled by a flexible transmitter 27 to a bell crank assembly 28 that is carried on the frame assembly 12 generally beneath the seat 19 at the forward edge thereof. The bell crank assembly 28 is coupled by means of a pair of flexible transmitters 29 to the spindles of the front wheels 18 for steering in a known manner.

It should be noted that the frame 12 also includes a forwardly extending bumper bar 31 which affords a combined bumper and also a lifting device so that the operator or another individual may lift the vehicle for transportation. In addition, a curb bar 32 depends from the bumper 31 and extends rearwardly. The curb bar 32 will afford protection from running into curbs and also will tend to provide stability for the vehicle 11 when travelling down an steep incline. The bar 32 will engage the ground under this condition and insure that the vehicle cannot be overturned.

If desired, a pair of hydraulic shock absorber spring assemblies, indicated generally at 33 in FIG. 5, can be employed in the event the front wheels 18 are suspended from the frame assembly for suspension travel. These shock absorber spring assemblies will cushion the movement of the front wheels 18 relative to the frame assembly 12 in a known manner.

A front wheel braking assembly, including brake discs 34 may be affixed for rotation with the front wheels 18 and operated by means of a brake actuator 35 on the handlebar 25 for braking of the vehicle.

The vehicle 11 is provided with a drive system, as aforenoted, which permits the operator to pedal the vehicle 11 for self propulsion. This pedaling system includes a crank assembly, indicated generally by the reference numeral 36 that is journaled at the front end of the frame assembly 12 about an axis that is disposed above and forwardly of the rotational axis of the front wheels 18. This location gives a convenient and comfortable pedalling arrangement for a rider sitting on the seat 19. The crank assembly 36 drives a sprocket 37 which is coupled by means of a chain 38 to a first sprocket assembly 39 that is journaled on the frame assembly approximately at the front edge of the seat 19 but well below it. The sprocket assembly 39 drives a second chain 41 which, in turn, drives a second sprocket assembly 42 that is positioned rearwardly of the sprocket assembly 39. The second sprocket assembly 42 drives a further chain 43 which, in turn, drives a further sprocket 44 that is affixed to the input shaft of a hydraulic pump 45. This pump shaft also has a further sprocket 46 affixed to it which drives the rear wheel 13 through a chain 47 and sprocket 48. The connection between the sprocket 444 and the shaft of the pump 45 may include an overrunning clutch so that the pump 45 may be driven faster that the sprocket 44 under certain circumstances, as will be described.

Figure 7:
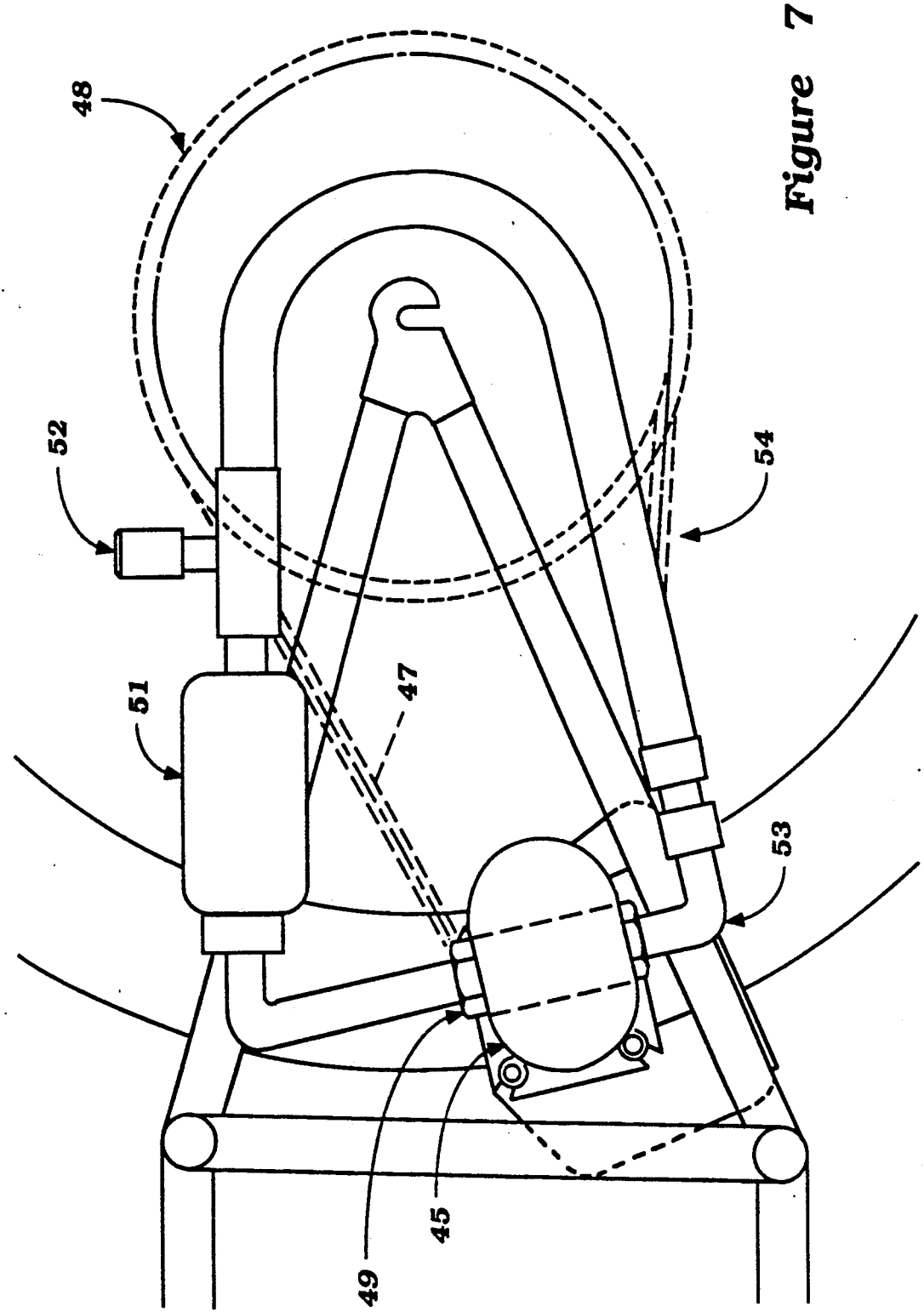
FIG. 7 is an enlarged side elevational view showing the fluid mechanism acting as an automatic brake and also an exercising device.

Referring now in most detail to FIG. 7, it should be noted that the pump 45 is provided with a closed hydraulic circuit comprised of a pressure line 49 by which the pump 45 may charge an accumulator 51. The accumulator 51 discharges through a variable orifice valve 52, which can be manually set, into a return conduit 53 that goes back to the inlet side of the pump 45. This mechanism, indicated generally by the reference numeral 54, serves two functions. First, it acts as an automatic brake so as to limit the speed at which the vehicle 11 will travel when coasting down an incline. Second, it offers a system whereby the operator may place a specific load on the pedal crank 36 so as to set his exercise condition even when the vehicle 11 is being powered by the internal combustion engine, to be described.

Referring first to the brake operation, when the vehicle 11 is coasting down a hill, the rear wheel 13 will drive the sprocket 48 and sprocket 46 to drive the pump 45. By setting the amount of restriction of the valve 52, the braking operation can be set so as to limit the maximum speed at which the vehicle 11 will attain during coasting. The exercise operation of the device will be described after description of the way in which the internal combustion engine operates the vehicle.

There is provided a suitable prime mover, such as a single-cylinder air cooled internal combustion engine 55 that has its output shaft driving a drive shaft 56 that is coupled by a ring and pinion gear 57 to the rear wheel 13 for driving it. A further chain 58 may couple the sprocket 46 to the input shaft of the engine 55 through a one way clutch 59 so that the operator may pedal start the engine 55 as with a moped. Hence, when the operator comes to a steep incline, he may start the engine 55 and permit the engine to either drive or assist in driving the vehicle 11 up the hill. Assuming the engine 55 is driving the vehicle, however, the operator may still obtain the benefit of exercise. This is true even if the operator uses the motor 55 for driving the vehicle on a level ground. In order to achieve this purpose, the operator can operate the crank pedal 36 so as to pump the fluid motor 45 and set the restriction of the valve 52 in order to provide the desired degree of exercise. In this way, the vehicle can be both powered by the internal combustion engine 55 and the operator can additionally obtain exercise by operating the pump 45 and the hydraulic load associated with it.

A small fuel tank 61 is carried at the rear of the frame assembly 12 beneath a rail 62 that can form a luggage carrier and which is supported by a frame portion 63.

It should be readily apparent from the foregoing description that the described vehicle is highly useful for permitting a wide variety of persons to obtain exercise without having to do so at a fixed location. In addition, exercise can be achieved even though an internal combustion engine is powering the vehicle if the operator becomes tired or needs assistance. The vehicle is also provided with an automatic brake which forms part of the exercise system so as to provide wide utility. Although an embodiment of the invention has been illustrated and described, various changes and modifications may be made without departing from the spirit and scope of the invention as defined by the appended claims.

I claim:

1. A self-propelled three-wheel vehicle comprised of a frame assembly journaling a single rear wheel at the rear thereof and a pair of dirigible front wheels at the front thereof, said rear wheel having a substantially larger diameter than said front wheels, a seat carried by said frame longitudinally between said front wheels and said rear wheel and positioned so that the seat portion is disposed below the top of at least said rear wheel with the back portion of said seat lying at least in part above said rear wheel so that a rider seated thereon is in a partially reclined position, a crank assembly journaled about an axis position forwardly and above the axes of said front wheels for pedalling by an operator seated upon said seat, transmission means for operatively connecting said crank assembly to said rear wheel for driving said rear wheel, and automatic braking means coupled with one of said wheels for limiting the speed at which said vehicle will travel under a coasting condition.

2. A self-propelled three-wheel vehicle as set forth in claim 1 wherein the braking means comprises a hydraulic brake.

3. A self-propelled three-wheel vehicle as set forth in claim 2 wherein the hydraulic brake comprises a pump driven by the one vehicle wheel and circulating fluid through a passage with a restriction formed therein for providing the hydraulic braking.

4. A self-propelled three-wheel vehicle as set forth in claim 3 wherein the restriction is a variable restriction.

5. A self-propelled three-wheel vehicle as set forth in claim 4 further including a skid plate extending forwardly of the front wheels and adapted to engage the ground so as to prevent the vehicle from overturning about the rotational axes of the front wheels.

6. A self-propelled three-wheel vehicle as set forth in claim 5 wherein there is further provided a lifting device adjacent the skid plate.

7. A self-propelled three-wheel vehicle as set forth in claim 1 further including a skid plate extending forwardly of the front wheels and adapted to engage the ground so as to prevent the vehicle from overturning about the rotational axes of the front wheels.

8. A self-propelled three-wheel vehicle as set forth in claim 1 further including an internal combustion engine carried by the frame assembly for driving one of the wheels thereof.

9. A self-propelled three-wheel vehicle comprised of a frame assembly journaling a single rear wheel at the rear thereof and a pair of dirigible front wheels at the front thereof, said rear wheel having a substantially larger diameter than said front wheels, a seat carried by said frame longitudinally between said front wheels and said rear wheel and positioned so that the seat portion is disposed below the top of at least said rear wheel with the back portion of said seat lying at least in part above said rear wheel so that a rider seated thereon is in a partially reclined position, a crank assembly journaled about an axis position forwardly and above the axes of said front wheels for pedalling by an operator seated upon said seat, transmission means for operatively connecting said crank assembly to said rear wheel for driving said rear wheel, a skid plate extending forwardly of said front wheels and adapted to engage the ground for preventing overturning of said vehicle about the rotational axes of said front wheels, and a lifting device adjacent said skid plate.

10. A self-propelled three-wheel vehicle as set forth in claim 8 wherein the crank assembly is connected to the rear wheel through an overrunning clutch so that the internal combustion engine can drive the vehicle without driving the crank assembly.

11. A self-propelled three-wheel vehicle comprised of a frame assembly journaling a single rear wheel at the rear thereof and a pair of dirigible front wheels at the front thereof, said rear wheel having a substantially larger diameter than said front wheels, a seat carried by said frame longitudinally between said front wheels and said rear wheel and positioned so that the seat portion is disposed below the top of at least said rear wheel with the back portion of said seat lying at least in part above said rear wheel so that a rider seated thereon is in a partially reclined position, a crank assembly journaled about an axis position forwardly and above the axes of said front wheels for pedalling by an operator seated upon said seat, transmission means for operatively connecting said crank assembly to said rear wheel for driving said rear wheel, prime mover means carried by said frame assembly for driving one of the wheel, said crank assembly being connected to the rear wheel through an overrunning clutch so that said prime mover can drive said vehicle without driving the crank assembly, braking means coupled with one of said wheels for limiting the speed at which said vehicle may travel under a coasting condition and means for permitting the operator to drive said braking means for exercise when the vehicle is being powered by the internal combustion engine.

12. A self-propelled three-wheel vehicle as set forth in claim 11 wherein the braking means comprises a hydraulic brake.

13. A self-propelled three-wheel vehicle as set forth in claim 12 wherein the hydraulic brake comprises a pump driven by the one vehicle wheel and circulating fluid through a passage with a restriction formed therein for providing the hydraulic braking.

14. A self-propelled three-wheel vehicle as set forth in claim 13 wherein the restriction is a variable restriction.

15. A self-propelled three-wheel vehicle including an operator pedaled crank assembly, transmission means for driving at least one wheel of said vehicle from said crank assembly, a hydraulic pump assembly coupled to one of the wheels of said vehicle for driving said pump assembly along with said one wheel and a closed fluid circuit from the outlet of said hydraulic pump to the inlet of said hydraulic pump including a variable resistance whereby said pump assembly acts as a governor brake on the vehicle.

16. A self-propelled three-wheel vehicle as set forth in claim 15 wherein the wheel with which the hydraulic pump assembly is coupled is the same wheel driven by the crank assembly.

17. A self-propelled three-wheel vehicle as set forth in claim 16 further including a prime mover operatively connected to one of the vehicle wheels for driving the one vehicle wheel, said crank assembly being operative to permit the operator to exercise by operating said pump assembly when said prime mover is driving said vehicle.

18. A propelled and exercise vehicle having an operator-controlled crank assembly, first transmission means for operatively connecting said crank assembly to one of the wheels of said vehicle for operator propulsion of said vehicle, an internal combustion engine operatively connected to a second transmission assembly for one of the wheels of said vehicle for propelling said vehicle, a load coupled to said crank assembly so that an operator may pedal said load during internal combustion engine propulsion of said vehicle so that an operator may exercise while the internal combustion engine is powering said vehicle.

19. A propelled and exercise vehicle as set forth in claim 18 wherein the load comprises a hydraulic pump assembly circulating fluid through a closed path in which a restriction is formed.

20. A propelled and exercise vehicle as set forth in claim 19 wherein the restriction is adjustable for permitting the operator to vary the amount of load.

* * * * *